US009304875B2

(12) United States Patent
Anumalasetty et al.

(10) Patent No.: US 9,304,875 B2
(45) Date of Patent: Apr. 5, 2016

(54) DYNAMICALLY TRACKING LOGICAL UNITS MOVING BETWEEN INPUT/OUTPUT PORTS OF A STORAGE AREA NETWORK TARGET

(71) Applicant: INTERNATIONAL BUSINESS MACHINES CORPORATION, Armonk, NY (US)

(72) Inventors: Kiran Kumar Anumalasetty, Bangalore (IN); Phani Kumar Ayyagari, Andhra Pradesh (IN); Sudhir Maddali, Hyderabad (IN); Ramesh Kumar Marupaka, Andhra Pradesh (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/690,129

(22) Filed: Nov. 30, 2012

(65) Prior Publication Data

US 2014/0157046 A1    Jun. 5, 2014

(51) Int. Cl.
*G06F 11/00*   (2006.01)
*G06F 11/20*   (2006.01)

(52) U.S. Cl.
CPC ........ *G06F 11/2007* (2013.01); *G06F 11/2005* (2013.01)

(58) Field of Classification Search
CPC ............ G06F 11/2005; G06F 11/2007; G06F 11/201; G06F 11/2017

USPC ................................................... 714/4.11, 4.2
See application file for complete search history.

(56) References Cited

U.S. PATENT DOCUMENTS

| | | | |
|---|---|---|---|
| 6,625,747 B1 * | 9/2003 | Tawil et al. ................... | 714/6.22 |
| 6,775,230 B1 * | 8/2004 | Watanabe et al. ............. | 370/228 |
| 7,512,832 B1 * | 3/2009 | Lent et al. ..................... | 714/4.11 |
| 7,685,310 B2 | 3/2010 | Ueoka et al. | |
| 7,711,979 B2 * | 5/2010 | Salli .............................. | 714/4.1 |
| 8,086,896 B2 | 12/2011 | Allen et al. | |
| 8,626,967 B1 * | 1/2014 | Naik et al. ...................... | 710/38 |
| 8,699,322 B1 * | 4/2014 | Tawri et al. ................... | 370/216 |
| 2003/0018927 A1 * | 1/2003 | Gadir et al. ....................... | 714/4 |
| 2003/0131182 A1 * | 7/2003 | Kumar et al. .................... | 711/5 |
| 2003/0172331 A1 * | 9/2003 | Cherian et al. ................ | 714/712 |
| 2004/0151188 A1 * | 8/2004 | Maveli et al. ................. | 370/398 |
| 2005/0010688 A1 * | 1/2005 | Murakami et al. ........... | 709/245 |
| 2006/0117212 A1 * | 6/2006 | Meyer et al. ..................... | 714/4 |
| 2007/0070975 A1 * | 3/2007 | Otani et al. ................... | 370/351 |
| 2007/0283186 A1 * | 12/2007 | Madnani et al. .................. | 714/6 |
| 2013/0238930 A1 * | 9/2013 | Umbehocker ............... | 714/6.32 |

\* cited by examiner

*Primary Examiner* — Marc Duncan
(74) *Attorney, Agent, or Firm* — Eustace P. Isidore; Yudell Isidore PLLC (57) ABSTRACT

A technique for operating a storage area network includes detecting an input/output operation failure associated with a logical unit number, which is associated with a first target port. The technique also includes determining, subsequent to the detected input/output operation failure, whether the logical unit number is associated with a second target port. Finally, the technique includes routing subsequent input/output operations for the logical unit number to the logical unit number via the second target port, in response to determining that the logical unit number is associated with the second target port.

20 Claims, 5 Drawing Sheets

DYNAMICALLY TRACKING LOGICAL UNITS MOVING BETWEEN INPUT/OUTPUT PORTS OF A STORAGE AREA NETWORK TARGET

BACKGROUND

This disclosure relates generally to a storage area network (SAN) and, more particularly, to techniques for dynamically tracking logical unit numbers moving between input/output (I/O) ports of a SAN target.

In computer system storage, a logical unit number (LUN) is a number used to identify a logical unit, which is a device addressed by a small computer system interface (SCSI) protocol or a protocol that encapsulates SCSI, such as Fibre Channel (FC). SCSI is a set of standards for physically connecting and transferring data between computer systems and peripheral devices. The SCSI standards define commands, protocols, and electrical and optical interfaces. The SCSI protocol defines communication from host-to-host, host-to-peripheral device, and peripheral device-to-peripheral device. Typically, most peripheral devices are SCSI targets that are incapable of acting as SCSI initiators, i.e., unable to initiate SCSI transactions themselves.

FC protocol is a transport protocol that predominantly transports SCSI commands over FC networks. FC supports a number of protocols, including SCSI, asynchronous transfer mode (ATM), and Internet protocol (IP). FC is a popular storage area network (SAN) protocol that allows organizations to consolidate storage into data center storage arrays, while providing hosts (such as database and web servers) with the illusion of locally-attached disks. A SAN is a dedicated storage network that provides access to consolidated block level data storage. A SAN architecture is typically used to attach remote computer storage devices (e.g., disk arrays, tape libraries, and optical jukeboxes) to servers in such a way that the devices appear locally attached, with respect to an operating system (OS). In general, a SAN only provides block-level operations, as contrasted with file abstraction. However, file systems may be built on top of SANs to provide file abstraction. Protocols employed in SANs include SCSI, FC, advanced technology attachment (ATA), and ATA over Ethernet (AoE), among other protocols.

LUNs may be used with any peripheral device that supports read/write operations, but are most often used to refer to logical disks created on a SAN. Peripheral device storage (or secondary storage) differs from primary storage in that secondary storage is not directly accessible by a central processing unit (CPU) of a server computer system (server). That is, a server usually employs input/output (I/O) channels to access secondary storage and transfers desired data to a CPU using an intermediate area in primary storage. Unlike most primary storage, secondary storage does not lose data when a storage device is powered down, i.e., secondary storage is non-volatile. In general, modern computer systems typically have two orders of magnitude more secondary storage than primary storage. In modern computer systems, secondary storage usually takes the form of hard disk drives (HDDs) or solid state drives (SSDs).

FC host bus adapters (HBAs) are generally available for all major computer architectures and buses. Each FC HBA has a unique world wide name (WWN), which is similar to an Ethernet media access control (MAC) address in that the WWN uses an organizationally unique identifier (OUI) that is assigned by the Institute of Electrical and Electronics Engineers (IEEE). A first type of WWN is a world wide node name (WWNN), which can be shared by some or all ports of a peripheral device. A second type of WWN is a world wide port name (WWPN), which is necessarily unique to each port of a peripheral device.

SUMMARY

According to one aspect of the present disclosure, a technique for operating a storage area network (SAN) includes detecting an input/output (I/O) operation failure associated with a logical unit number (LUN), which is associated with a first target port. The technique also includes determining, subsequent to the detected I/O operation failure, whether the LUN is associated with a second target port. Finally, the technique includes routing subsequent I/O operations for the LUN to the LUN via the second target port, in response to determining that the LUN is associated with the second target port.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one skilled in the art, aspects of the present invention may be embodied as a system, method, or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list)

of the computer-readable storage medium include: a portable computer diskette, a hard disk, a random access memory (RAM), a read-only memory (ROM), an erasable programmable read-only memory (EPROM) or Flash memory, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider (ISP)).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

Logical unit numbers (LUNs) exported from a port of a storage server may have to be remapped to another port for various reasons. As one example, when a storage administrator needs to take down a port of a target (e.g., a hard disk drive (HDD) array), all LUNs for the port that is to be taken down need to be exported to another port in the array. As another example, when one port is heavily loaded with I/O operations and other ports are relatively less loaded (which is possible in a storage area network (SAN) where storage is shared by multiple hosts, especially in a cluster environment), it may be desirable to remap at least some LUNS of the heavily loaded port to one or more of the other ports.

On the server (host) side, all modern OSs typically employ a multipath I/O (MPIO) solution to balance their I/O load equally on all available paths. As is known, MPIO is a fault-tolerant and performance enhancement technique that provides more than one physical path between a central processing unit (CPU) in a computer system and its mass storage devices through buses, controllers, switches, and bridge devices that connect the CPU to the mass storage devices. Even when an MPIO solution is implemented, it is possible that all or most of the paths utilized by a host are through a given storage port more frequently than other storage ports. In general, hosts are not aware of a load distribution on I/O ports of a target in a SAN and, as such, cannot make intelligent path selections as one host in a SAN is not aware of the I/O operations generated by other hosts to the target.

As such, a SAN administrator may be required to remap LUNs from time-to-time to balance I/O loads at ports of a SAN target. A storage administrator may also remap LUNs on a SAN when maintenance of the SAN is required. Conventionally, in-flight I/O operations on LUNs that are moved from one port to another port are adversely effected when maintenance activities interfere with ongoing application activity. In general, it is desirable to minimize disruption to applications that are using LUNs that are to be remapped. Typically, it is not feasible for a storage administrator to bring an application down or keep track of all I/O operations and trigger maintenance only when there are no active I/O operations to any LUNs of a SAN. Data integrity/reliability issues can occur if maintenance activities, such as dynamic LUN remapping, are initiated when there is a heavy I/O load on a LUN to be remapped.

Conventionally, an operating system (OS) fails an I/O operation when a port associated with a LUN is disconnected. In the event there are any pending I/Os in-flight, an associated application has retried all of the pending I/Os. It should be appreciated that retrying pending I/Os may adversely impact performance when there are a relatively large number of I/Os in-flight. Some conventional SANs provide an option of migrating a LUN. However, conventional LUN migration involves a block-by-block copy of data from a source LUN to a destination LUN, prior to changing LUN location information from the source to destination LUN. Using this conventional solution, a host I/O is not disrupted as a location of the LUN and a connection path (an initiator-target-LUN (ITL) nexus) are unchanged. However, using the conventional solution to address port unavailability is expensive and time consuming, as the conventional solution involves copying all LUN blocks on a block-by-block basis.

I/O virtualization is a methodology that is typically implemented to simplify management, lower costs, and improve performance of servers. I/O virtualization environments are created by abstracting upper layer protocols from physical connections. I/O virtualization enables one physical adapter card to appear as multiple virtual network interface cards (vNICs) and virtual host bus adapters (vHBAs). vNICs and vHBAs function as conventional NICs and HBAs and are designed to be compatible with existing OSs, hypervisors, and applications. To networking resources (e.g., LANs and SANs), the vNICs and vHBAs appear as normal cards and adapters. Virtual I/O provides a shared transport for all network and storage connections. Virtual I/O addresses performance bottlenecks by consolidating I/O to a single connection, whose bandwidth ideally exceeds the I/O capacity of an associated server (to ensure that an associated I/O link is not a bottleneck). Bandwidth is then dynamically allocated in real-time across multiple virtual connections to both storage and network resources. In I/O intensive applications, I/O virtualization can help increase both virtual machine (VM) performance and the number of VMs that may execute on a given server.

Storage virtualization refers to the process of abstracting logical storage from physical storage. In general, physical storage resources are aggregated into storage pools, from which logical storage is created. Storage virtualization presents a logical space for data storage and transparently handles the process of mapping the logical space to the actual physical location. Storage virtualization is typically implemented in modern HDD arrays using vendor proprietary solutions. However, the goal of storage virtualization is usually to virtualize multiple disk arrays from different vendors, scattered over a network, into a single monolithic storage device, which can be managed uniformly.

File systems, which are the most common means of accessing disk storage, are abstractions of a physical storage object (e.g., rotating magnetic media, solid-state electronic devices, directory structured magnetic tapes) into a more human friendly format, where data can be organized into files, folders and other similar objects. Many modern OSs, including those derived from the UNIX or Windows OSs, abstract the final connection between the file system into, for example, a device switch, a device array, or a device control block. Each physical device, as well as each type of physical device (which may also include network connected storage, virtualized disk storage, etc.) has a different handle, identifier, or other type of object. These data structures or objects include the information needed by the OS or disk I/O subsystem to convert requests for disk I/O into actual data transfer (i.e., either reading or writing).

Remapping a logical unit number (LUN) to a different port of a SAN, according to the present disclosure, provides a less expensive and time consuming option than conventional LUN migration. According to the present disclosure, dynamically remapping a LUN on a target (e.g., HDD array) from an old storage port to a new storage port (on the same SAN target) advantageously minimizes disruption of application input/output (I/O) operations, as the application I/Os are seamlessly routed to the new storage port. In general, the existing problem of application I/O operation disruption due to dynamic LUN remapping can be mitigated without breaking a communication path between a host and a SAN.

Figure 1:
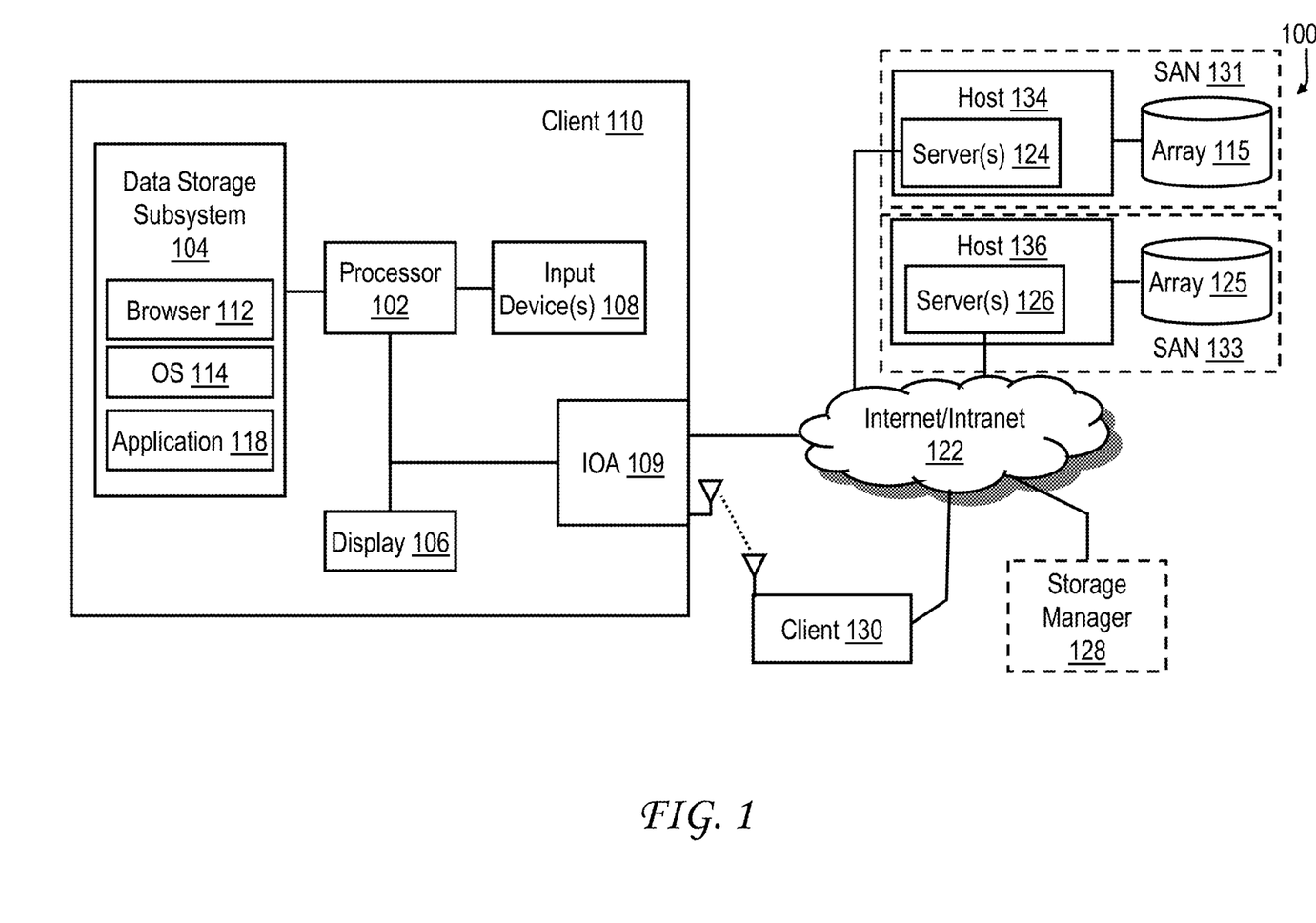
FIG. 1 is a block diagram of an example data processing environment that may be configured to dynamically track logical unit numbers (LUNs) between input/output (I/O) ports of storage area network (SAN) targets according to various aspects of the present disclosure.

With reference to FIG. 1, an example data processing environment 100 is illustrated that includes a client 110 and a client 130 that may be in communication with various file servers and web page servers, via an Internet/Intranet 122. Clients 110 and 130 may take various forms, such as workstations, laptop computer systems, notebook computer systems, smart phones, web-enabled portable devices, or desktop computer systems. For example, client 110 may correspond to a desktop computer system of a computer system user and client 130 may correspond to a web-enabled device of another computer system user.

Client 110 includes a processor 102 (which may include one or more processor cores for executing program code) coupled to a data storage subsystem 104, a display 106 (e.g., a cathode ray tube (CRT) or a liquid crystal display (LCD)), one or more input devices 108 (e.g., a mouse, keyboard, haptic device, and/or a touch screen), and an input/output adapter (IOA) 109. IOA 109 supports communication of client 110 with one or more wired and/or wireless networks utilizing one or more communication protocols, such as 802.x, hypertext transfer protocol (HTTP), simple mail transfer protocol (SMTP), etc, and further facilitates communication between clients 110 and 130. IOA 109 may be virtualized as: a Fibre Channel (FC) adapter, a small computer system interface (SCSI) adapter, or an InfiniBand (IB) adapter, among other adapters. Data storage subsystem 104 may include, for example, an application appropriate amount of volatile memory (e.g., dynamic random access memory (DRAM)), non-volatile memory (e.g., read-only memory (ROM) or static RAM), and/or non-volatile mass storage device, such as a magnetic or optical disk drive. Data storage subsystem 104 includes an operating system (OS) 114 for client 110, as well as application programs, such as a browser 112 (which may optionally include customized plug-ins to support various client applications), and application 118 (which may include an email application, a word processing application, a presentation application, a spreadsheet application, etc.).

Clients 110 and 130 are coupled via one or more wired or wireless networks, such as Internet/intranet 122, to hosts 134 and/or 136 and respective virtualized I/O servers 124 and 126. Hosts 134 and 136 may be coupled to optional storage manager 128 (which may be a SAN manager) via Internet/Intranet 122. Virtualized I/O servers 124 and 126 provide respective access to data stored on HDD arrays 115 and 125, which may each embody one or more targets. Hosts 124 and 126 may be physically located in, for example, a same room of a building, a different room of a building, a different building in a limited geographical area, or a different geographical area (e.g., different cites, counties, states, or countries).

It should be appreciated that hosts 134 and 136 may each implement a virtual machine manager (VMM) or hypervisor for controlling operation of the virtualized I/O servers (which may each utilize the same or a different OS), as well as a dynamic tracking application (not separately shown) that, when executed by hosts 134 and 136, facilitates tracking LUNs that are moved between ports of a SAN target. While only two clients and two hosts (i.e., physical platforms) are shown associated with data processing environment 100, it should be appreciated that more or less than two clients and more or less than two hosts may be implemented in a data processing environment configured according to the present disclosure. Host 134 and storage array 115 may be included within a SAN 131. Similarly, host 136 and storage array 125 may be included within a different SAN 133. Storage arrays 115 and 125 may each correspond to, for example, redundant array of inexpensive disks (RAID) arrays.

It should be appreciated that LUN remapping may occur in various scenarios. For example, when a target of a SAN has two ports and a storage administrator changes the cabling for one of the ports of the target, LUNs connected to the port for which the cabling is changed may be assigned to another port on the same target.

Figure 2:
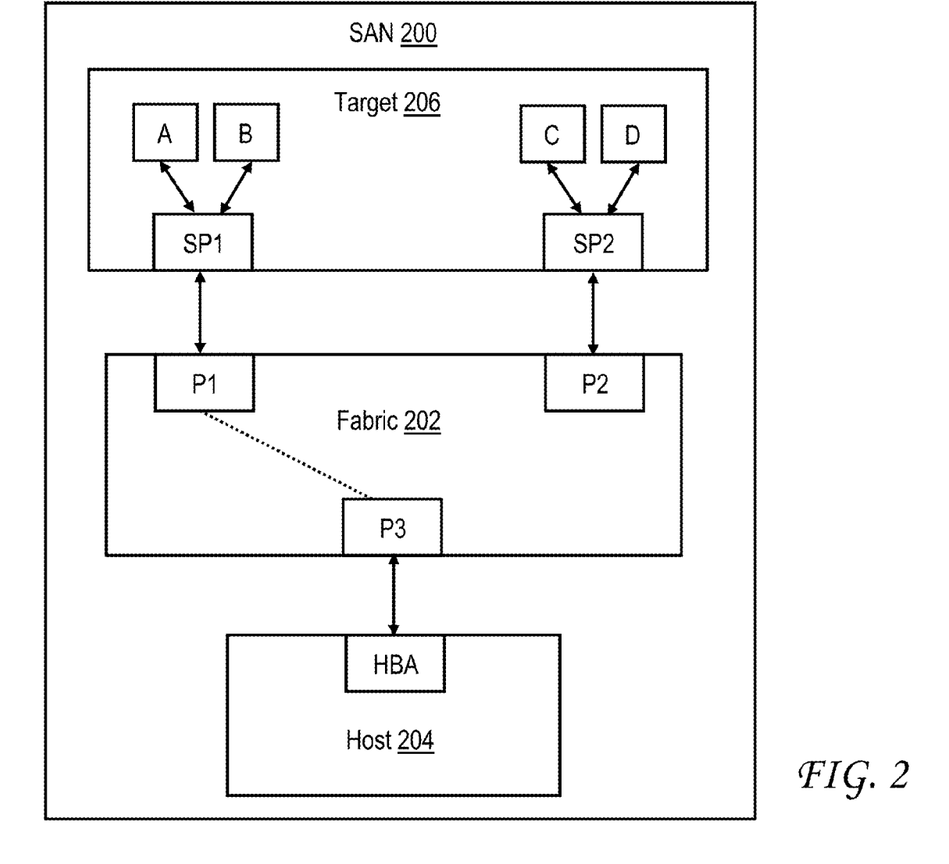
FIG. 2 is a block diagram of an example SAN that illustrates a route taken by I/O operations between a host and LUN, as embodied in a target.

As is illustrated in FIG. 2, a SAN 200 includes a host 204 that is connected to a target 206 via a fabric 202. SANs 131 and 133 of FIG. 1 may, for example, be configured in a manner similar to SAN 200. In SAN 200, a host bus adapter (HBA) of host 204 employs a fibre channel (FC) connection to both storage ports (labeled 'SP1' and 'SP2') of target 206. In a typical application, target 206 includes a HDD array, such as a RAID array that is configured to include one or more targets. In a typical embodiment, host 204 initiates a login process to storage ports (labeled 'SP1' and 'SP2') of target 206 and saves various information (i.e., a world wide node name (WWNN), a world wide port name (WWPN), etc.) related to target 206 obtained during the login process. For example, host 204 may be performing I/O operations with respect to LUN A, which is accessed via the SP1 port of target 206. In FIG. 2, an I/O path for the I/O operations from host 206 to LUN A may be represented by: host 204→fabric 202→SP1 port of target 206→LUN A.

Figure 3:
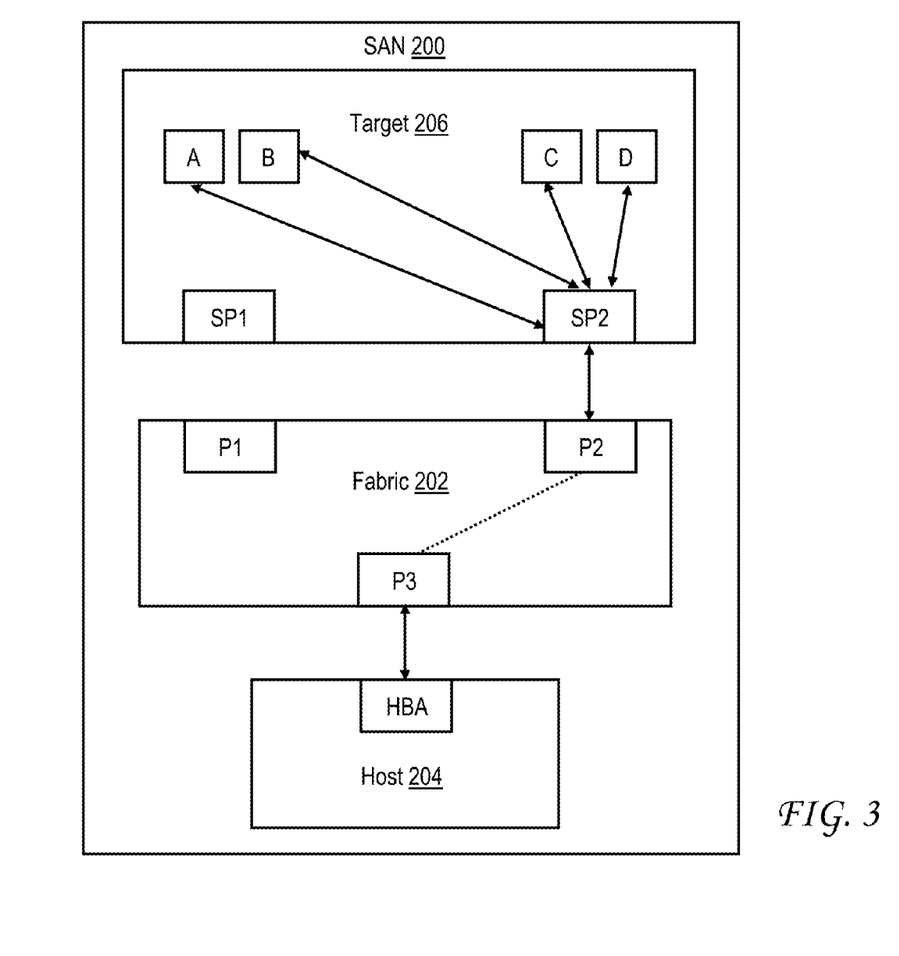
FIG. 3 is a block diagram of the example SAN of FIG. 2 that illustrates another route taken by I/O operations (between the host and the LUNs) following reassignment of some of the LUNs to a different port of the target.

As is illustrated in FIG. 3, LUNs A and B have been unmapped from the SP1 port and dynamically remapped to the SP2 port of target 206 by a storage administrator (e.g., using storage manager 128 of FIG. 1). In this case, subsequent I/O operations to LUN A on the SP1 port of target 206 fail with an invalid LUN error notification (e.g., a SCSI check condition, or an additional sense code (ASC)/additional sense code qualifier (ASCQ) (ASC/ASCQ) value of 08/04) as LUN A (as well as LUN B) has been remapped to the SP2 port of target 206. According to the present disclosure, in response to an I/O operation failure to the SP1 port, host 204 will quiesce the failed I/O operation to LUN A on the SP1 port and start a recovery process. For example, from the saved login information for each target port host 204 may compare a WWNN with the WWNN of the failed port (i.e., the SP1 port). As any ports with a same WWNN belong to the same target (i.e., target 206), host 204 will issue a query (e.g., Report LUNS) to obtain LUN identifiers (IDs) on all the matched target ports returned.

For each reported LUN, host 204 issues an inquiry (e.g., an SCSI INQUIRY) to obtain a device serial number for the reported LUNs. According to one or more aspects, host 204 then compares the device serial number of LUN A with that of the reported LUNs. In response to a match between a device serial number of a reported LUN and the device serial number for LUN A, host 204 determines that a storage port associated with the matched LUN is the new owner of the remapped LUN A. In this case, host 204 then routes the subsequent I/O operations to LUN A via the target port identified (i.e., the SP2 port). Host 204 then updates its configuration information. In this case, future communications between host 204 and LUN A use the new target port (i.e., host 204→fabric 202→SP2 port of target 206→LUN A).

Figure 4:
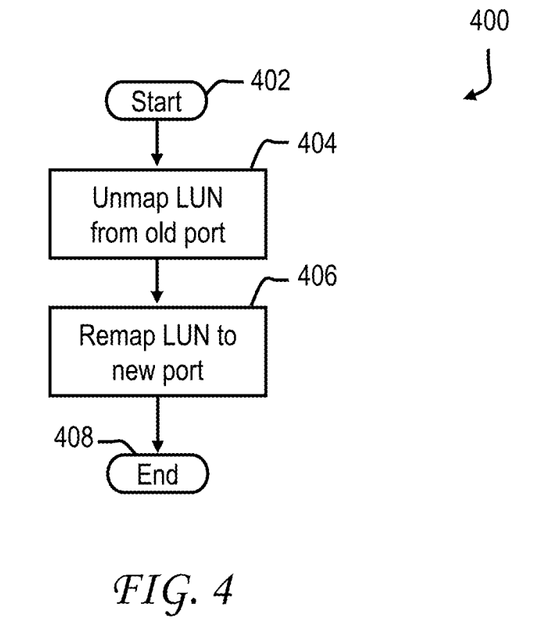
FIG. 4 is a flowchart of an example administrative process for unmapping LUNs from an old port and remapping the unmapped LUNs to a new port on a same target, according to various aspects of the present disclosure.

With reference to FIG. 4, a flowchart of an example administrative process 400 for unmapping LUNs from an old port and remapping the unmapped LUNs to a new port on a same target is illustrated according to one aspect of the present disclosure. Process 400 is initiated in block 402 in response to, for example, a storage administrator initiating execution of a mapping routine on storage manager 128 of FIG. 1. Next, in block 404, the storage administrator selects to unmap one or more LUNs from a port of a target. For example, the storage administrator may choose to unmap LUNs A and B from the SP1 port of target 206. Next, in block 406, the storage administrator selects to remap one or more LUNs to another port of target 206. For example, the storage administrator may choose to remap LUNs A and B from the SP1 port of target 206 to the SP2 port of target 206.

Figure 5:
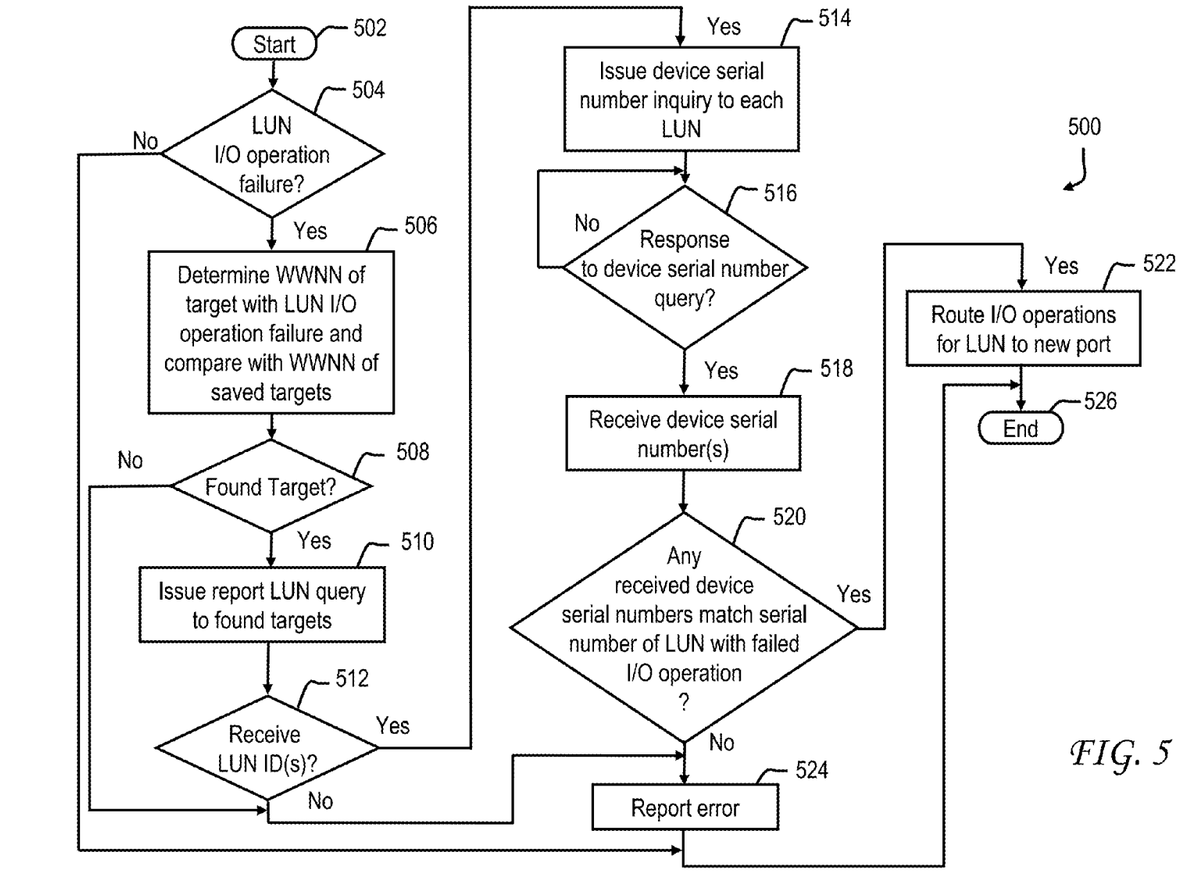
FIG. 5 is a flowchart of an example process for rerouting I/O operations following LUN remapping according to various aspects of the present disclosure.

With reference to FIG. 5, a process 500 for dynamically tracking logical unit numbers (LUNs) between input/output (I/O) ports of a storage area network (SAN) target, according to an embodiment of the present disclosure, is illustrated. For better understanding, process 500 is discussed in conjunction with FIGS. 2 and 3. Process 500 is initiated (e.g., in response to host 204 executing an I/O operation to a logical unit number (LUN), such as LUN A, in block 502, at which point control transfers to decision block 504. In block 504, host 204 detects whether an I/O operation failure has occurred in response to the I/O operation to the LUN. For example, when the I/O operation is directed to LUN A (see FIG. 2) via storage port SP1 of target 206, which may be a hard disk drive (HDD) array, a failure will occur when LUN A has been remapped to a different storage port.

In response to host 204 not detecting an I/O operation failure in block 504, control transfers to block 526, where process 500 terminates until a next I/O operation is initiated by host 204. In response to host 204 detecting an I/O operation failure in block 504, control transfers to block 506. For example, host 204 may detect an I/O operation failure to LUN A when a storage administrator has remapped LUN A to storage port SP2 of target 206 and disconnected a cable between port P1 of fabric 202 and storage port SP1 of target 206 (see FIG. 3).

In block 506, host 204 determines a first identifier (e.g., a world wide node name (WWNN)) for the SP1 port of target 206. For example, from the saved login information for each target port host 204 may determine the WWNN of the failed port (i.e., the SP1 port). Next, in decision block 508 host 204 determines whether a target has been found with the WWNN of the failed port. In response to a target not being found in block 508, control transfers to block 524 where host 204 reports an error to the storage administrator, e.g., via storage manager 128 (see FIG. 1). Following block 524, control transfers to block 526. In response to a target being found in block 508, control transfers to block 510 where host 204 issues a report LUN query to target ports with the first identifier (i.e., the SP1 and SP2 ports of target 206, as ports on a same target have a same WWNN). That is, as any ports with a same WWNN belong to the same target (i.e., target 206), host 204 will issue a query (e.g., Report LUNS) to obtain LUN identifiers (IDs) on all the matched target ports returned.

Then, in decision block 512, host 204 determines whether a response to the report LUN query has been received (e.g., within a predetermined time). As the SP1 port of target 206 is not connected to fabric 202, no response is received from LUNs associated with the SP1 port. In response to not receiving a response to the LUN query in block 512, control transfers to block 524, where host 204 reports an error to the storage administrator, e.g., via storage manager 128 (see FIG. 1). Following block 524, control transfers to block 526. In response to receiving a response to the LUN query in block 512 from LUNs associated with the SP2 port of target 206, control transfers to block 514, where host 204 issues a device serial number inquiry to each LUN.

Then, in decision block 516, host 204 determines whether a response to the device serial number inquiry has been received. Control loops on block 516 until a response to the device serial number inquiry is received. In response to a response being received by host 204 in block 516, control transfers to block 518. In block 518 host 204 receives the device serial numbers for LUNs A-D. Next, in decision block 520, host 204 compares a device serial number for LUN A to the received device serial numbers. In response to none of the received device serial numbers matching the device serial number for LUN A, control transfers to block 524 where host 204 reports an error. In response to one of the received device serial numbers matching the device serial number for LUN A in block 520, control transfers to block 522. In block 522 host 204 routes subsequent I/O operations for LUN A to the SP2 port of target 206. Following block 522 control transfers to block 526.

Accordingly, techniques have been disclosed herein that dynamically tracking logical unit numbers between input/output ports of a storage area network target.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of operating a storage area network, comprising:
    detecting, by a data processing system, an input/output operation failure associated with a logical unit number, wherein the logical unit number is associated with a first target port;
    in response to detecting the input/output operation failure associated with a logical unit number, the data processing system:
        determining a first identifier of a target associated with the first target port;
        receiving one or more logical unit number identifiers that are associated with the first identifier;
        issuing a device identifier inquiry for the one or more logical unit number identifiers received;
        in response to issuing the device identifier inquiry, receiving one or more device identifiers associated with the one or more logical unit number identifiers;
        comparing a device identifier of the logical unit number to the one or more device identifiers to determine a matching device identifier, wherein the matching device identifier matches the device identifier;
        defining a new owner for the logical unit number, wherein the new owner is a storage port associated with the matching device identifier; and
        determining a second target port that is associated with the logical unit number, wherein second target port is the storage port associated with the matching device identifier; and
    in response to determining that the logical unit number is associated with the second target port, routing, by the data processing system, future input/output operations for the logical unit number via the second target port.

2. The method of claim 1, wherein the determining, by the data processing system, whether the logical unit number is associated with a second target port further comprises:
    issuing, by the data processing system, a report logic unit number query to one or more target ports that are associated with the first identifier to determine the one or more logical unit number identifiers that are associated with the first identifier.

3. The method of claim 1, wherein the first identifier is a world wide node number.

4. The method of claim 1, wherein the device identifiers are device serial numbers.

5. The method of claim 1, wherein the first and second target ports are associated with a same storage area network target.

6. The method of claim 1, wherein the first and second target ports are respective ports of a redundant array of inexpensive disks (RAID) array.

7. The method of claim 1, wherein the first and second target ports are respective ports of a hard disk drive array of a storage area network.

8. A computer program product, comprising a non-transitory computer-readable storage medium and computer-readable code for tracking logical unit numbers between input/output ports of storage area network targets embodied on the non-transitory computer-readable storage medium, wherein the computer-readable code, when executed by a processor of a data processing system, causes the processor to:
    detect an input/output operation failure associated with a logical unit number, wherein the logical unit number is associated with a first target port;

in response to detecting the input/output operation failure associated with a logical unit number:
  determine a first identifier of a target associated with the first target port;
  receive one or more logical unit number identifiers that are associated with the first identifier;
  issue a device identifier inquiry for the one or more logical unit number identifiers received;
  in response to issuing the device identifier inquiry, receive one or more device identifiers associated with the one or more logical unit number identifiers;
  compare a device identifier of the logical unit number to the one or more device identifiers to determine a matching device identifier, wherein the matching device identifier matches the device identifier;
  define a new owner for the logical unit number, wherein the new owner is a storage port associated with the matching device identifier; and
  determine a second target port that is associated with the logical unit number, wherein second target port is the storage port associated with the matching device identifier; and
in response to determining that the logical unit number is associated with the second target port, route future input/output operations for the logical unit number via the second target port.

9. The computer program product of claim 8, wherein the computer-readable code, when executed by the processor of the data processing system, further causes the processor to:
  issue a report logic unit number query to one or more target ports that are associated with the first identifier to determine the one or more logical unit number identifiers that are associated with the first identifier.

10. The computer program product of claim 8, wherein the first identifier is a world wide node number.

11. The computer program product of claim 8, wherein the device identifiers are device serial numbers.

12. The computer program product of claim 8, wherein the first and second target ports are associated with a same storage area network target.

13. The computer program product of claim 8, wherein the first and second target ports are respective ports of a redundant array of inexpensive disks (RAID) array.

14. The computer program product of claim 8, wherein the first and second target ports are respective ports of a hard disk drive array of a storage area network.

15. A data processing system, comprising:
a memory system; and
a processor coupled to the memory system, wherein the processor is configured to:
  detect an input/output operation failure associated with a logical unit number, wherein the logical unit number is associated with a first target port;
  in response to detecting the input/output operation failure associated with a logical unit number:
    determine a first identifier of a target associated with the first target port;
    receive one or more logical unit number identifiers that are associated with the first identifier;
    issue a device identifier inquiry for the one or more logical unit number identifiers received;
    in response to issuing the device identifier inquiry, receive one or more device identifiers associated with the one or more logical unit number identifiers;
    compare a device identifier of the logical unit number to the one or more device identifiers to determine a matching device identifier, wherein the matching device identifier matches the device identifier;
    define a new owner for the logical unit number, wherein the new owner is a storage port associated with the matching device identifier; and
    determine a second target port that is associated with the logical unit number, wherein second target port is the storage port associated with the matching device identifier; and
  in response to determining that the logical unit number is associated with the second target port, route future input/output operations for the logical unit number via the second target port.

16. The data processing system of claim 15, wherein the processor is further configured to:
  issue a report logic unit number query to one or more target ports that are associated with the first identifier to determine the one or more logical unit number identifiers that are associated with the first identifier.

17. The data processing system of claim 15, wherein the first identifier is a world wide node number.

18. The data processing system of claim 15, wherein the device identifiers are device serial numbers.

19. The data processing system of claim 15, wherein the first and second target ports are associated with a same storage area network target.

20. The data processing system of claim 15, wherein the first and second target ports are respective ports of a hard disk drive array of a storage area network.

* * * * *